(12) United States Patent
Aso et al.

(10) Patent No.: US 10,608,483 B2
(45) Date of Patent: Mar. 31, 2020

(54) STATOR, ELECTRIC MOTOR, AND AIR CONDITIONER

(71) Applicant: Mitsubishi Electric Corporation, Tokyo (JP)

(72) Inventors: Hiroki Aso, Tokyo (JP); Tomoaki Oikawa, Tokyo (JP); Mineo Yamamoto, Tokyo (JP); Hiroyuki Ishii, Tokyo (JP); Junichiro Oya, Tokyo (JP); Yuto Urabe, Tokyo (JP)

(73) Assignee: Mitsubishi Electric Corporation, Tokyo (JP)

(*) Notice: Subject to any disclaimer, the term of this patent is extended or adjusted under 35 U.S.C. 154(b) by 61 days.

(21) Appl. No.: 15/746,837

(22) PCT Filed: Aug. 13, 2015

(86) PCT No.: PCT/JP2015/072932
§ 371 (c)(1),
(2) Date: Jan. 23, 2018

(87) PCT Pub. No.: WO2017/026073
PCT Pub. Date: Feb. 16, 2017

(65) Prior Publication Data
US 2018/0212480 A1    Jul. 26, 2018

(51) Int. Cl.
*H02K 1/18* (2006.01)
*H02K 3/24* (2006.01)
*H02K 3/28* (2006.01)
*H02K 3/34* (2006.01)
*H02K 5/08* (2006.01)
(Continued)

(52) U.S. Cl.
CPC .............. *H02K 1/18* (2013.01); *H02K 1/185* (2013.01); *H02K 3/24* (2013.01); *H02K 3/28* (2013.01); *H02K 3/345* (2013.01); *H02K 3/522* (2013.01); *H02K 5/08* (2013.01); *H02K 5/225* (2013.01); *H02K 7/14* (2013.01)

(58) Field of Classification Search
CPC ............ H02K 1/18; H02K 5/225; H02K 5/08; H02K 3/522; H02K 1/185; H02K 3/345; H02K 3/28; H02K 3/24; H02K 7/14
USPC ...................................... 310/43, 71
See application file for complete search history.

(56) References Cited

U.S. PATENT DOCUMENTS 6,870,292 B2    3/2005  Owada et al.
7,919,896 B2 *  4/2011  Takeshita ............... H02K 3/487
                                                        310/214

(Continued)

FOREIGN PATENT DOCUMENTS

JP    H04-017539 A    1/1992
JP    2003-164088 A   6/2003

(Continued)

OTHER PUBLICATIONS

Office Action dated Feb. 3, 2019 issued in corresponding CN patent application No. 201580082022.X (and English translation).

(Continued)

*Primary Examiner* — John K Kim
(74) *Attorney, Agent, or Firm* — Posz Law Group, PLC (57) ABSTRACT

A stator includes a plurality of winding sections circumferentially disposed at an equal interval; a spacer inserted into a space between the winding sections; and a resin section filling the space into which the spacer is inserted.

9 Claims, 11 Drawing Sheets

(51) Int. Cl.
*H02K 5/22* (2006.01)
*H02K 7/14* (2006.01)
*H02K 3/52* (2006.01)

(56) References Cited

U.S. PATENT DOCUMENTS

| | | | | |
|---|---|---|---|---|
| 8,922,076 | B2* | 12/2014 | Hsieh | H02K 5/128 310/43 |
| 8,946,948 | B2* | 2/2015 | Adachi | H02K 5/10 310/194 |
| 8,987,958 | B2* | 3/2015 | Chen | H02K 1/185 310/43 |
| 9,568,012 | B2* | 2/2017 | Aso | F04D 13/064 |
| 2005/0140233 | A1* | 6/2005 | Kojima | F04D 25/0653 310/156.37 |
| 2007/0145842 | A1* | 6/2007 | Zhu | F04D 29/582 310/88 |
| 2008/0231131 | A1* | 9/2008 | Gabrys | H02K 3/47 310/114 |
| 2011/0036127 | A1* | 2/2011 | Lee | D06F 37/304 68/140 |
| 2012/0319543 | A1* | 12/2012 | Adachi | H02K 5/10 310/68 R |
| 2015/0022032 | A1* | 1/2015 | Hoyland | H02K 21/24 310/43 |
| 2015/0022050 | A1 | 1/2015 | Sawada et al. | |
| 2015/0159656 | A1* | 6/2015 | Urabe | H02K 1/02 165/104.31 |
| 2018/0212480 | A1* | 7/2018 | Aso | H02K 1/18 |

FOREIGN PATENT DOCUMENTS

| | | |
|---|---|---|
| JP | 2005-137126 A | 5/2005 |
| JP | 2007-252149 A | 9/2007 |
| WO | 2013/132935 A1 | 9/2013 |

OTHER PUBLICATIONS

International Search Report of the International Searching Authority dated Nov. 17, 2015 for the corresponding International application No. PCT/JP2015/072932 (and English translation).

Office action dated Aug. 7, 2018 issued in corresponding JP patent application No. 2017-534090 (and English translation attached).

* cited by examiner

STATOR, ELECTRIC MOTOR, AND AIR CONDITIONER

CROSS REFERENCE TO RELATED APPLICATION

This application is a U.S. national stage application of International Patent Application No. PCT/JP2015/072932 filed on Aug. 13, 2015, the disclosure of which is incorporated herein by reference.

TECHNICAL FIELD

The present invention relates to a stator having an outer cover formed of a mold resin, and an electric motor and an air conditioner using the stator.

BACKGROUND

Molded electric motors have been employed as the conventional indoor-unit fan motors or outdoor-unit fan motors used in air conditioners. A molded electric motor includes a stator having a stator core surrounded by a molded portion formed of molded resin, the molded portion being an outer cover of the stator (for example, see Patent Literature 1).

PATENT LITERATURE

Patent Literature 1: Japanese Patent Application Laid-open No. 2005-137126

The stator having an outer cover that is a molded portion formed of resin is desired to reduce the manufacturing cost.

SUMMARY

The present invention has been made in view of the above, and an object of the present invention is to provide a stator capable of reducing the amount of resin used for forming the molded portion that is the outer cover, thereby reducing the manufacturing cost.

In order to solve the above problems and achieve the object, a stator according to the present invention includes: a plurality of winding sections circumferentially disposed at an equal interval; a spacer inserted into a space between adjacent winding sections among the winding sections; and a resin section filling the space into which the spacer is inserted.

The stator according to the present invention provides an effect of reducing the amount of resin used for forming the molded portion that is the outer cover, thereby reducing the manufacturing cost.

DETAILED DESCRIPTION

A stator, an electric motor, and an air conditioner according to an embodiment of the present invention will be explained below in detail with reference to the drawings. This invention is not limited to the embodiment.

First Embodiment

Figure 1:
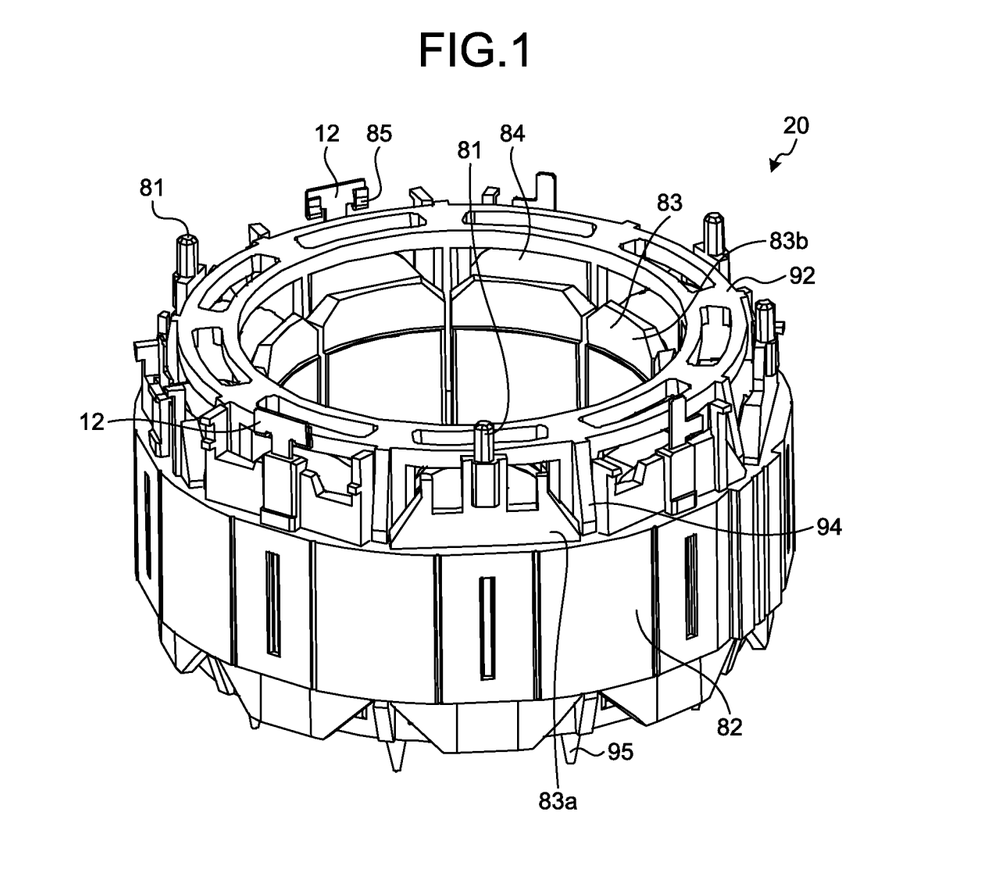
FIG. 1 is a perspective view of a core unit of a stator according to a first embodiment of the present invention.
Figure 2:
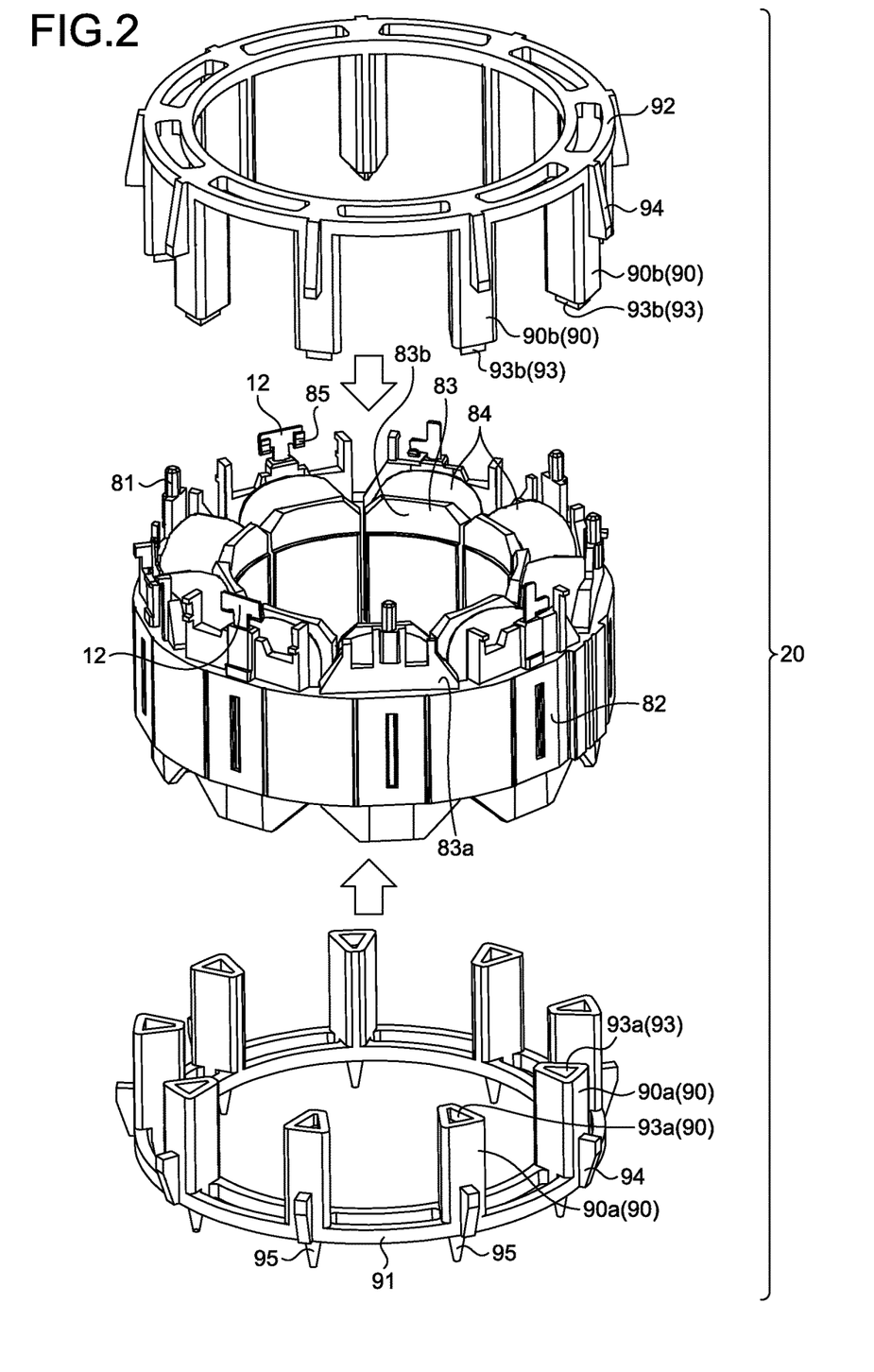
FIG. 2 is an exploded perspective view of the core unit in the first embodiment.
Figure 3:
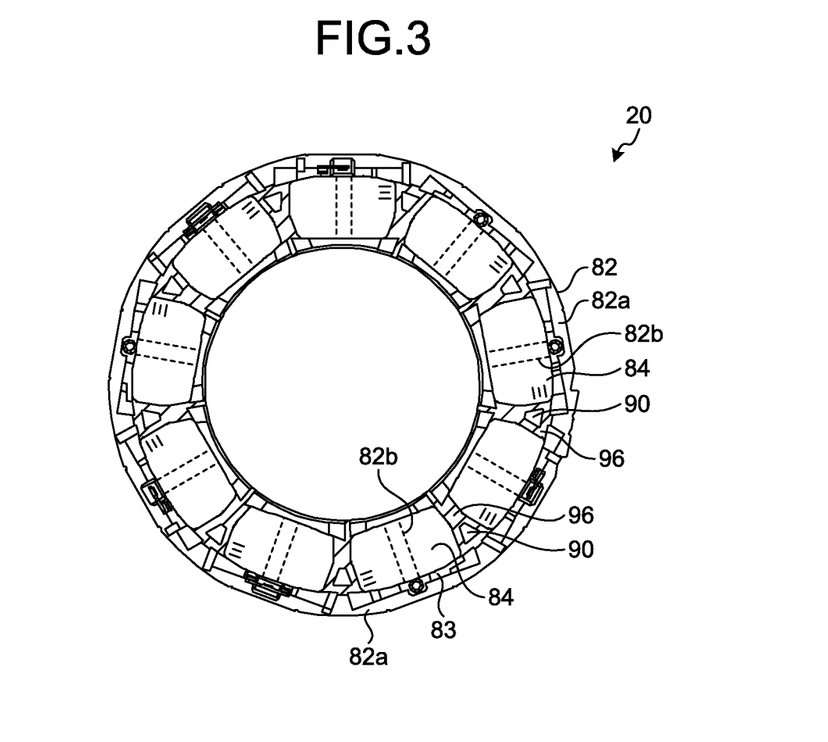
FIG. 3 is a plan view schematically illustrating the core unit in the first embodiment.
Figure 4:
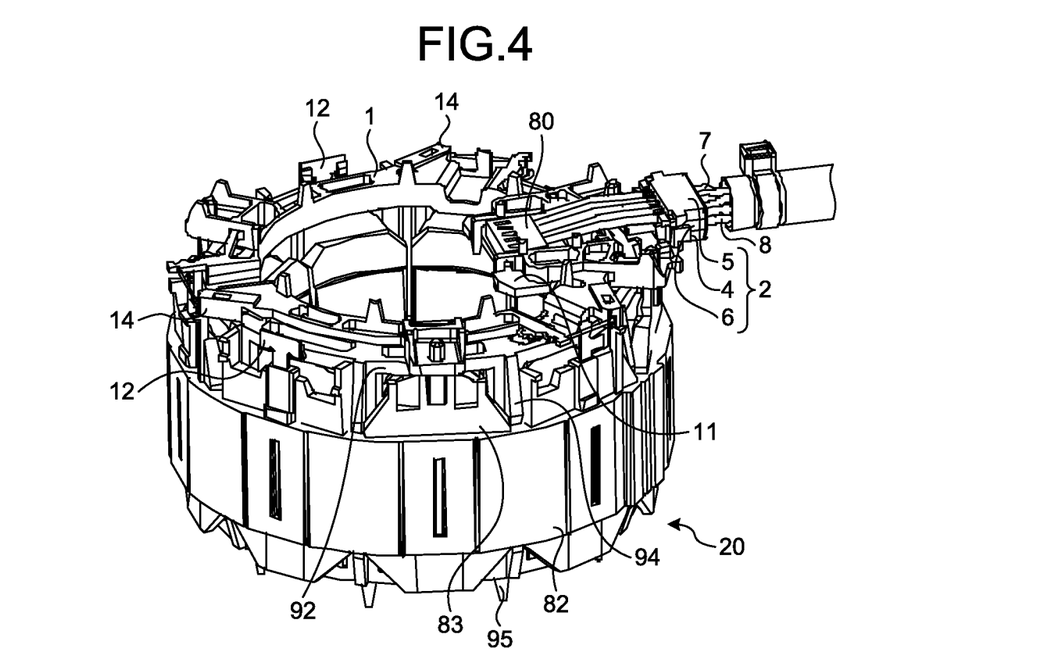
FIG. 4 is a perspective view of the core unit in the first embodiment with sensor leads and power leads connected to the core unit.
Figure 5:
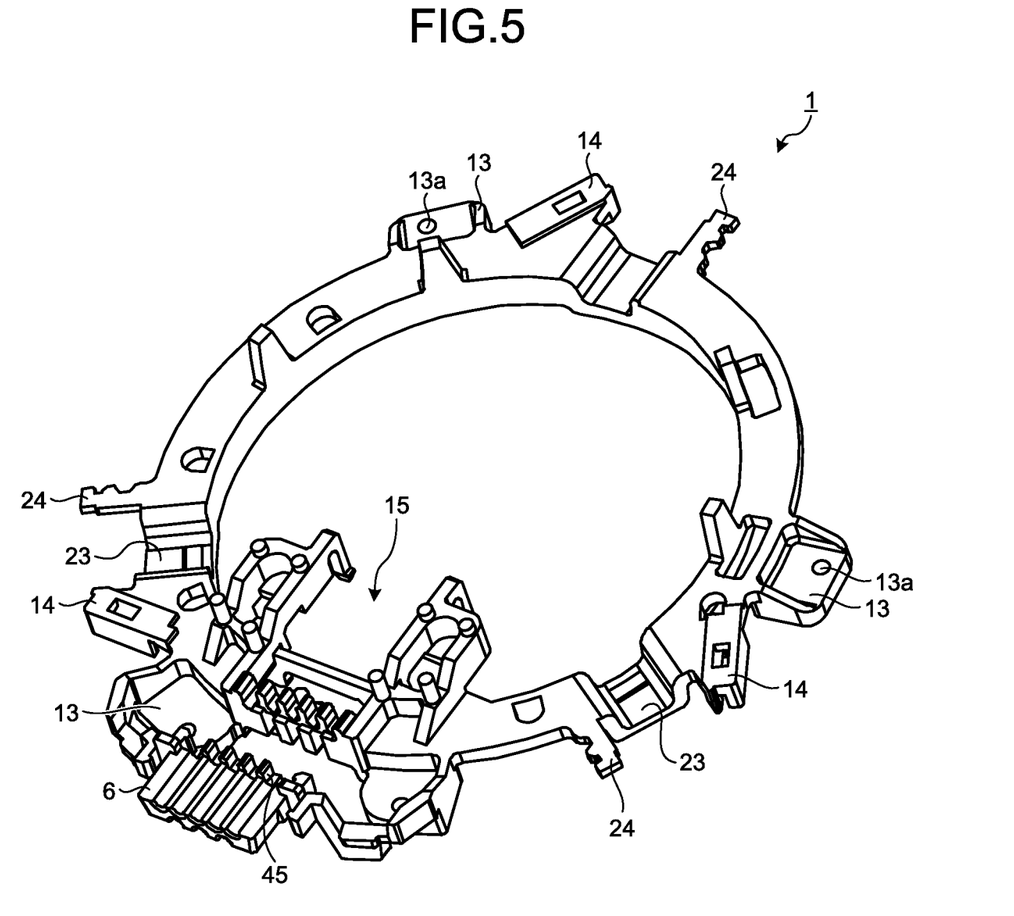
FIG. 5 is a perspective view of a lead wiring part in the first embodiment.
Figure 6:
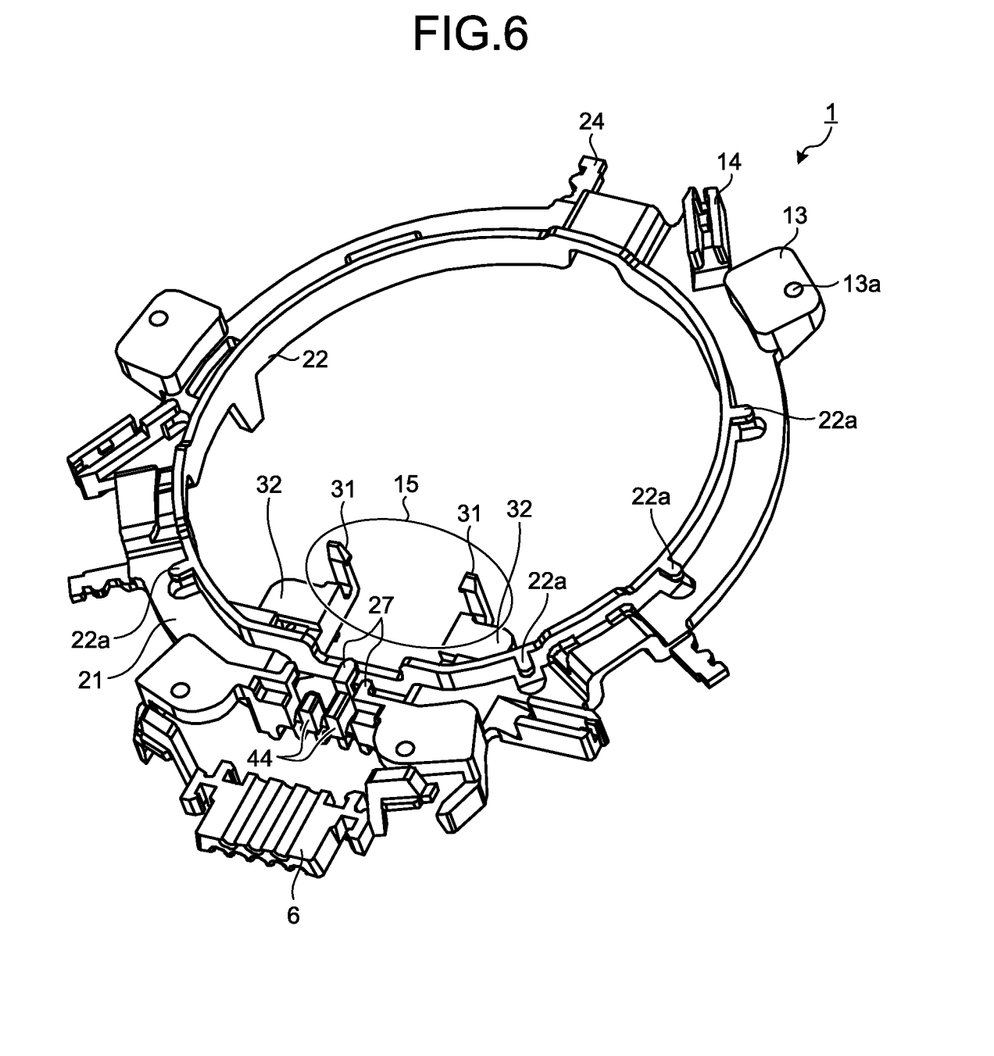
FIG. 6 is a perspective view of the lead wiring part in the first embodiment, as viewed from the opposite side of FIG. 5.
Figure 7:
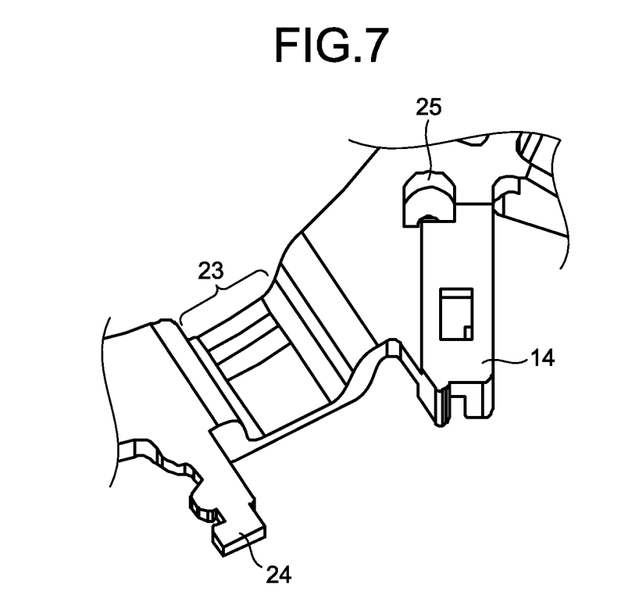
FIG. 7 is an enlarged view of a lead-end retaining portion in the first embodiment.
Figure 8:
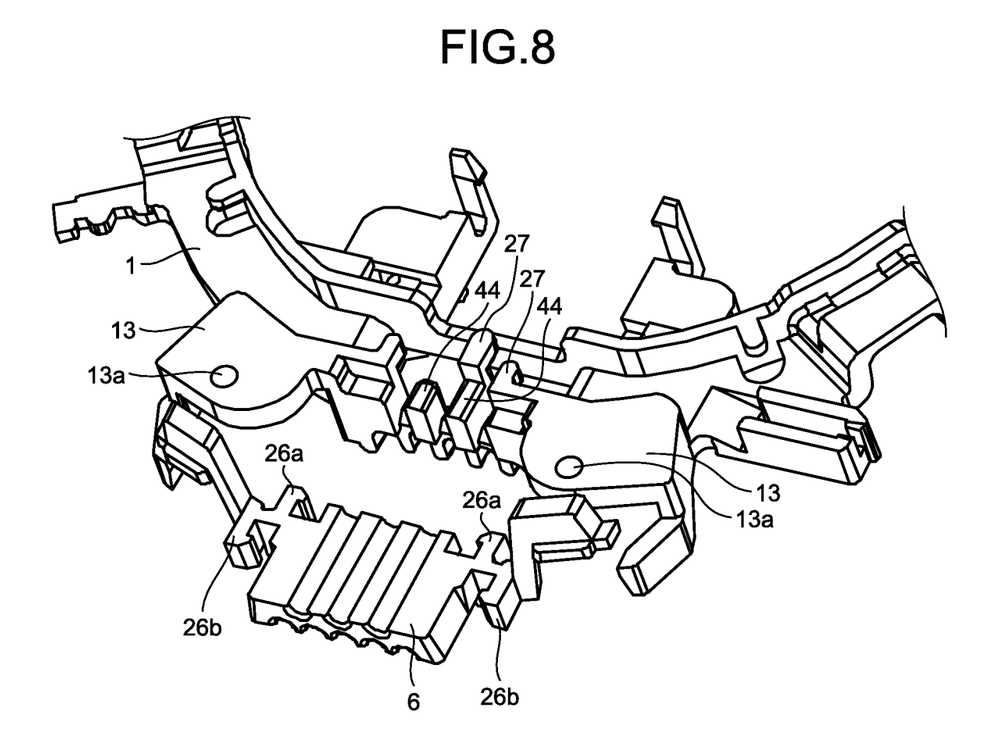
FIG. 8 is an enlarged view of a lead-out part and its surroundings in the first embodiment, as viewed from a side facing a stator unit.
Figure 9:
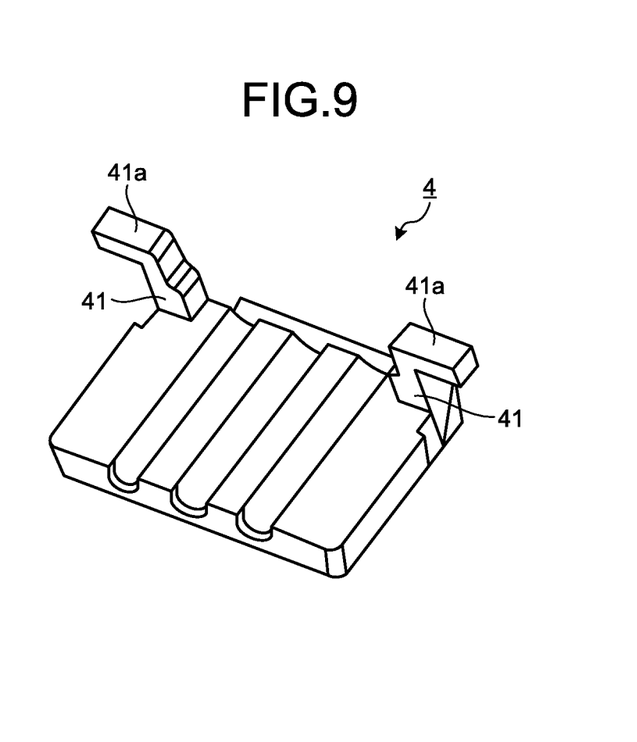
FIG. 9 is a perspective view of a power-lead retaining part in the first embodiment.
Figure 10:
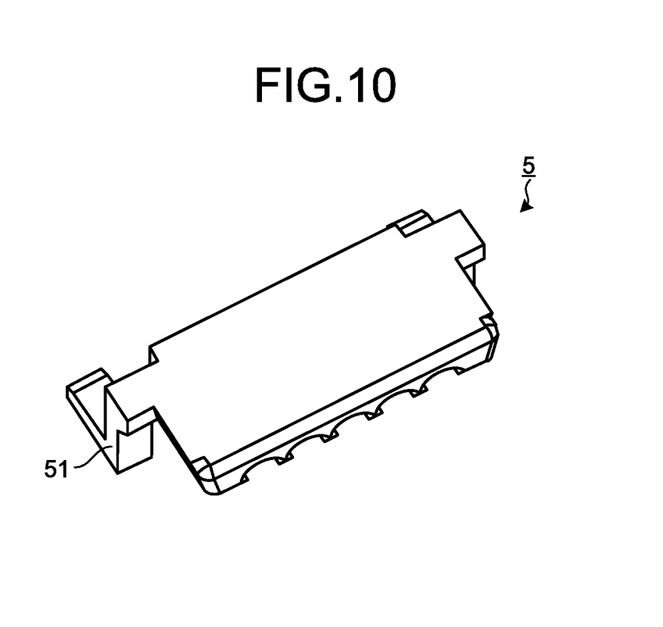
FIG. 10 is a perspective view of a sensor-lead retaining part in the first embodiment.
Figure 11:
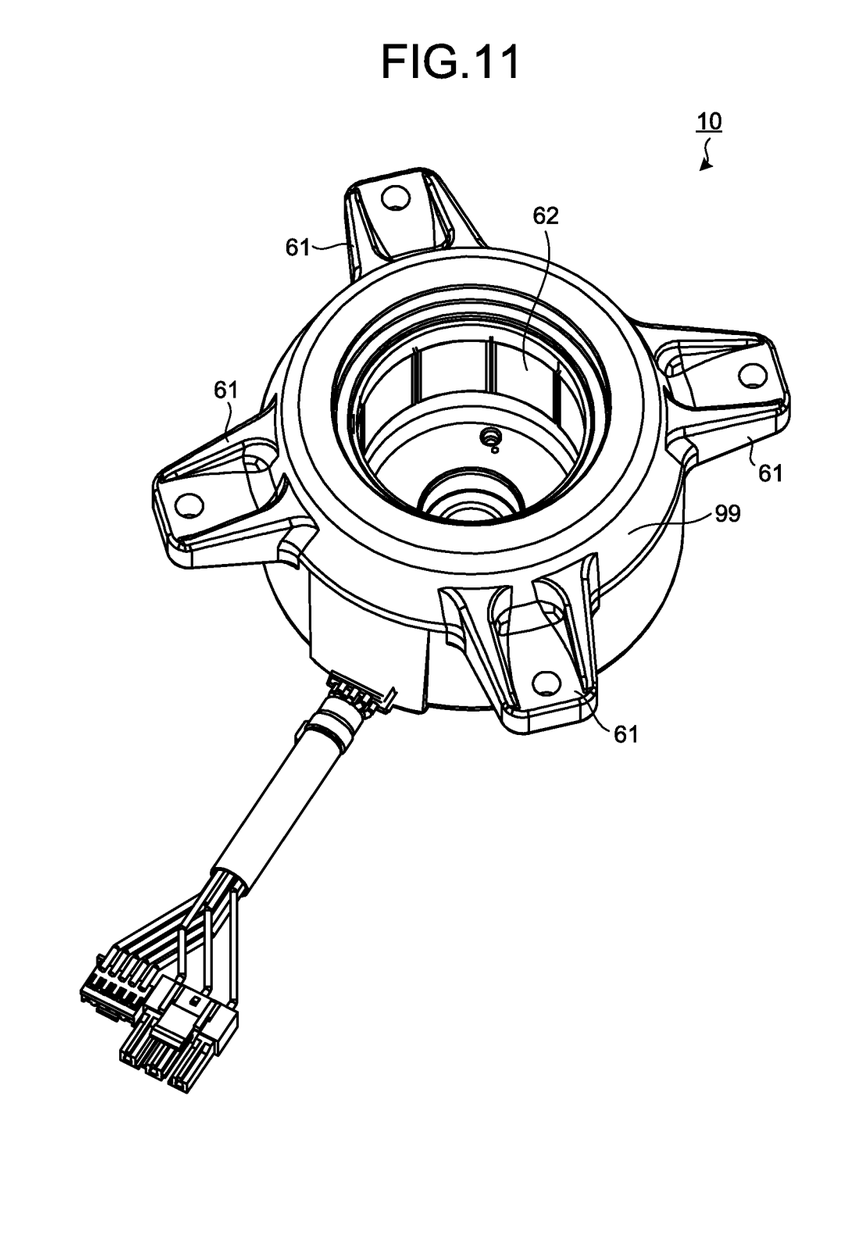
FIG. 11 is a perspective view of the stator according to the first embodiment.
Figure 12:
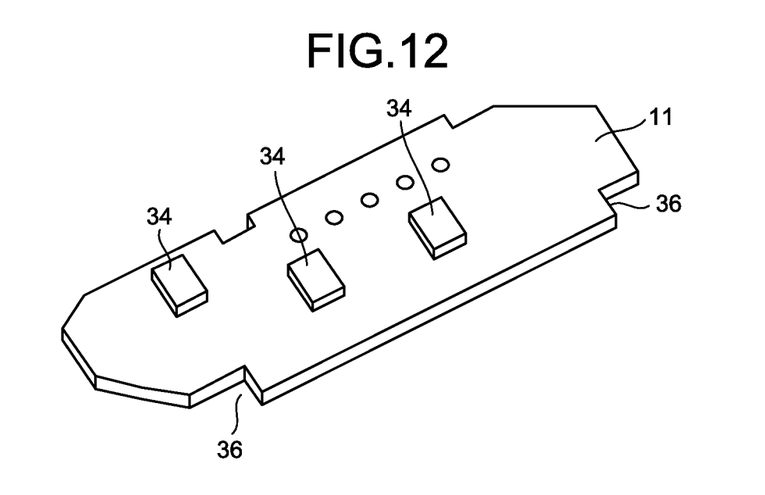
FIG. 12 is a perspective view of a substrate in the first embodiment.

FIG. 1 is a perspective view of a core unit of a stator according to a first embodiment of the present invention. FIG. 2 is an exploded perspective view of the core unit in the first embodiment. FIG. 3 is a plan view schematically illustrating the core unit in the first embodiment. FIG. 4 is a perspective view of the core unit in the first embodiment with sensor leads and power leads connected to the core unit. FIG. 5 is a perspective view of a lead wiring part in the first embodiment. FIG. 6 is a perspective view of the lead wiring part in the first embodiment, as viewed from the opposite side of FIG. 5. FIG. 7 is an enlarged view of a lead-end retaining portion in the first embodiment. FIG. 8 is an enlarged view of a lead-out part and its surroundings in the first embodiment, as viewed from a side facing a stator unit. FIG. 9 is a perspective view of a power-lead retaining part in the first embodiment. FIG. 10 is a perspective view of a sensor-lead retaining part in the first embodiment. FIG. 11 is a perspective view of the stator according to the first embodiment. FIG. 12 is a perspective view of a substrate in the first embodiment.

A core unit 20 includes a stator core 82, an insulating portion 83, and winding sections 84. A stator 10 illustrated in FIG. 11 is obtained by performing molding in order to confine the surroundings of the core unit 20 within a resin to form a molded portion 99. The molded portion 99 defines an outer cover of the stator 10.

The stator core 82 is formed of strip-shaped stamped magnetic steel sheets stacked on top of one another in the axial direction of a shaft 72 (see FIG. 15) of a rotor 73 through crimping, welding, bonding, or the like. As illustrated in FIG. 3, the stator core 82 includes a core back 82a having a cylindrical shape, and a plurality of teeth 82b that project toward a central axis of the cylindrical shape with respect to the inner circumference side of the core back 82a and are circumferentially arranged at an equal interval. The insulating portion 83 covers the outer circumference of the teeth 82b. The winding sections 84 are formed by winding wires such as magnet wires around the insulating portion 83. The winding sections 84 function as coils wound around the teeth 82b. The plurality of winding sections 84 are arranged at an equal interval on the circumference when viewed along the central axis. The insulating portion 83 is interposed between the winding sections 84 and the teeth 82b.

The insulating portion 83 is formed by molding a thermoplastic resin, such as PBT (Polybutylene Terephthalate), such that it is integral with the stator core 82 or is formed by attaching the molded thermoplastic resin to the stator core 82. The insulating portion 83 includes a plurality of pins 81 projecting toward a substrate 11 (see FIG. 4) and a plurality of terminals 12 to which power is supplied from an external source.

The wires defining the winding sections 84 are routed at one end to hook portions 85 of the terminals 12 and are joined to the hook portions 85 by fusing, soldering, or the like. The wires of all the phases are collected together at the other end to form a neutral point.

It is to be noted that the stator core 82 has a side on which the terminals 12 are disposed, which side is hereinafter referred to as a connection side, and the opposite side of the stator core to the connection side is hereinafter referred to as a counter-connection side.

An insulating outer wall 83a of the insulating portion 83 prevents the winding sections 84 from falling toward the outer circumferential side of the stator core 82. The plurality of pins 81 for attaching a lead wiring part 1 to the core unit 20 are disposed at the axial end portion of the insulating outer wall 83a on the connection side.

An insulating inner wall 83b of the insulating portion 83 prevents the winding sections 84 from falling toward the inner circumferential side of the stator core 82. Projections (not illustrated) are disposed at the axial end portion of the insulating inner wall 83b on the counter-connection side. When the core unit 20 is molded, the projections abut against a mold core metal portion of the mold in the axial direction.

The axial end portion of the insulating outer wall 83a is formed at a height slightly greater than the maximum axial height of the winding sections 84. Moreover, the winding sections 84 have their axial heights that decrease toward the insulating inner wall 83b from the insulating outer wall 83a. With this arrangement, the heights of the projections (not illustrated) on the counter-connection side of the insulating inner wall 83b can be the same as the height of the axial end portion of the insulating outer wall 83a, in which case a sufficient distance to the winding sections 84 is provided. Thus, when the core unit 20 is set on the mold core metal portion with the counter-connection side of the core unit 20 facing downward, the core unit 20 can be placed stably without the winding sections 84 abutting on the mold core metal portion. This results in an improvement in productivity and quality.

Power leads 8 for supplying power to the winding sections 84, and sensor leads 7 are connected to the core unit 20. A board-in connector 80 is connected to the terminal ends of the sensor leads 7. The terminal ends of the sensor leads 7, which are connected to the board-in connector 80, are located inside the mold when the core unit 20 is molded.

As illustrated in FIG. 12, electronic parts, such as Hall ICs 34 serving as a position detection circuit for the rotor 73, are mounted on the substrate 11. The board-in connector 80 includes contacts for electrically connecting the position detection circuit formed on the substrate 11 to the sensor leads 7. When the substrate 11 is attached to a substrate retaining portion 15 (see FIG. 5) while the board-in connector 80 is set on the counter-stator-side surface of the substrate 11, the contacts are exposed through a surface of the substrate 11 on a side of the core unit 20. The sensor leads 7 are electrically connected to the position detection circuit by soldering of the contacts exposed through the surface of the substrate on the side of the core unit 20 of the substrate 11.

The lead wiring part 1 illustrated in FIG. 5 and FIG. 6 is used for the arrangement of the sensor leads 7 and the power leads 8. Further, a lead lead-out portion 2 (see also FIG. 4), which includes a power-lead retaining part 4, a sensor-lead retaining part 5 and a lead-out part 6, maintains the positional relationship of the sensor leads 7 and the power leads 8 with the lead wiring part 1. The lead lead-out portion 2, i.e., the power-lead retaining part 4, the sensor-lead retaining part 5, and the lead-out part 6, are disposed for routing the sensor leads 7 and the power leads 8, which are laid on the lead wiring part 1, toward the outside of the lead wiring part 1. The lead lead-out portion 2 also serves to prevent the sensor leads 7 and the power leads 8 from being displaced from the routing position when the core unit 20 is molded.

Next, the lead wiring part 1 will be explained. The lead wiring part 1 is molded from a thermoplastic resin, such as PBT into a ring shape. As illustrated in FIG. 5, a plurality of attaching legs 13 for attachment to the core unit 20 are disposed on the outer circumference of the lead wiring part 1. Each of the attaching legs 13 has a hole 13a for allowing insertion of the pin 81 of the insulating portion 83 of the core unit 20 for attaching the lead wiring part 1. When the lead wiring part 1 is attached to the core unit 20, the attaching legs 13 come into abutment on the wiring-part installation surface of the insulating portion 83 of the core unit 20, thereby positioning the lead wiring part 1 in the axial direction. At this time, the pins 81 of the insulating portion 83 are inserted through the holes 13a of the attaching legs 13, such that the lead wiring part 1 is positioned in the rotational direction. After the positioning of the lead wiring part 1 is completed, i.e., after the pins 81 of the insulating portion 83 are inserted through the holes 13a of the attaching legs 13, the pins 81 are, for example, ultrasonically welded so as to secure the lead wiring part 1 to the core unit 20.

The arrangement of the power leads 8 will be explained. The power leads 8 are routed via the lead lead-out portion 2 to the terminals 12 of the core unit 20 along the lead wiring part 1. Specifically, the three-phase power leads, which define the power leads 8, are respectively routed to the terminals 12 arranged at intervals of approximately 120°. The terminal ends of the three-phase power leads 8, which have their covering stripped, are positioned in abutment on the walls of lead-end retaining portions 14. When the lead wiring part 1 is attached to the core unit 20, the three-phase power leads 8 are routed along a wall 22 (see FIG. 6) formed on the inner circumference of the surface of the lead wiring part 1, which surface facing the core unit 20. The power leads 8 are bent toward the lead-out part 6 at lead fold-back pins 27 disposed near the lead-out part 6, and are fittingly retained by lead retaining projections 44 disposed near the lead-out part 6. The lead fold-back pins 27 are projections that function to prevent displacement of the leads.

The three power leads 8 are routed to the different lead-end retaining portions 14 via a power lead retaining portion defined by the lead-out part 6 and the power-lead retaining part 4 disposed under the lead-out part 6. One of the two power leads 8 other than the power lead 8 routed to the lead-end retaining portion 14 farthest from the lead-out part 6 is routed outside the power lead 8 routed to the lead-end retaining portion 14 farthest from the lead-out part 6.

The core wires of the power leads 8 stripped of their covering are retained by core-wire retaining portions 24 each spaced a given distance from the lead-end retaining portions 14, such that the retained core wires are in proximity to the terminals 12 when the lead wiring part 1 is attached to the core unit 20.

Further, in order to provide spaces for electrodes that sandwich the terminals 12 and the core wires, the lead wiring part 1 is provided with recesses 23 for the electrodes to escape therethrough (see FIG. 7). The spaces for the electrodes that sandwich the terminals 12 and the core wires are spaces necessary for the operation of spot-welding the core wires and the terminals 12 after the lead wiring part 1 is attached to the core unit 20. The provision of the recesses 23 allows the power leads 8 to be routed closer to the core unit 20 from a lead wiring surface 21 (see FIG. 6) of the lead wiring part 1. Displacement prevention projections 25 are disposed near the recesses 23 for the electrodes to escape therethrough. The power leads 8 are axially positioned by the displacement prevention projections 25.

As illustrated in FIG. 8, the lead-out part 6 includes locking portions for retaining two types of lead retaining parts. That is, the lead-out part 6 includes locking portions 26*a* for retaining the power-lead retaining part 4, and locking portions 26*b* for retaining the sensor-lead retaining part 5.

As illustrated in FIG. 9, the power-lead retaining part 4 includes legs 41 that are to be hooked onto the locking portions 26*a* of the lead-out part 6. Projections 41*a* are provided at the tips of the legs 41. The power-lead retaining part 4 is axially positioned by bringing the projections 41*a* into abutment on the locking portions 26*a*. After the power leads 8 are laid on the lead-out part 6, the legs 41 are locked to the locking portions 26*a* of the lead-out part 6, whereby the power-lead retaining part 4 is attached to the lead-out part 6. With the power-lead retaining part 4 locked to the lead-out part 6, ribs provided on the power-lead retaining part 4 abut on the lead-out part 6, thereby suppressing the amount of opening from which leads are exposed.

The power-lead retaining part 4 is inserted from the central side of the lead wiring part 1 toward the outside for attachment to the lead-out part 6. At this time, the lead retaining projections 44 (see FIG. 6) of the lead wiring part 1 retain the power leads 8, and thus the lead-out part 6 does not need to retain the power leads 8. That is, the lead-out part 6 does not need to include projections or the like for retaining the power leads 8 when the power-lead retaining part 4 is attached to the lead-out part 6. Accordingly, the lead-out part 6 can be small in size, and the distance between the lead wiring part 1 and the lead-out part 6 can be ensured. This improves the workability in attaching the power-lead retaining part 4 to the lead-out part 6.

The substrate 11 having mounted thereon the Hall ICs 34 serving as a position detection circuit for the rotor 73 (see FIG. 15) is attached to the substrate retaining portion 15 (see FIG. 5 and FIG. 6) of the lead wiring part 1 on the inner circumference side of the lead-out part 6. Assembly legs 31 for attaching the substrate 11 thereto are formed on the substrate retaining portion 15. The substrate 11 has notches 36 formed at positions corresponding to the assembly legs 31 (see FIG. 12). The assembly legs 31 are locked on the notches 36, thereby securing the substrate 11 in the axial direction with respect to the lead wiring part 1.

Substrate pressing portions 32 extending in parallel to the substrate 11 are formed on the substrate retaining portion 15, and suppress deformation of the substrate 11 due to the resin pressure during molding. The suppression of the deformation of the substrate 11 improves the accuracy of position detection by the Hall ICs 34.

As illustrated in FIG. 10, the sensor-lead retaining part 5 includes L-shaped legs 51 that are to be hooked onto the locking portions 26*b* of the lead-out part 6 (see FIG. 8). The sensor-lead retaining part 5 is locked to the locking portions 26*b* of the lead-out part 6 and thus attached to the lead-out part 6 after the sensor leads 7 are laid on the lead-out part 6.

After the attachment of the substrate 11, the substrate 11 and the board-in connector 80 of the sensor leads 7 are soldered to each other, and the sensor leads 7 are routed toward the lead-out part 6 from the opposite surface of the lead wiring part 1 to the surface of the lead wiring part 1 on which the power leads 8 are laid. The sensor leads 7 are retained by retaining projections 45 formed on the lead-out part 6 and the legs 51 formed on the sensor-lead retaining part 5.

In the present embodiment, the sensor leads 7 are routed on the surface of the lead wiring part 1 on the counter-stator side while the power leads 8 are routed on the surface of the lead wiring part 1 on the stator side. Accordingly, the path on which the sensor leads 7 are routed and the path on which the power leads 8 are routed can be clearly distinguished, thereby facilitating the assemblage and reducing the cost for the assemblage. The facilitation of the assemblage can improve the quality. Furthermore, the projections 22*a* (see FIG. 6) disposed on the surface on the stator side retain the power leads 8 to thereby prevent the axial displacement of the power leads 8 and thus improve the quality.

Moreover, the power leads 8 are retained by the power-lead retaining part 4 locked to the locking portion 26*a* and the lead-out part 6 while the sensor leads 7 are retained by the sensor-lead retaining part 5 locked to the locking portions 26*b* and the lead-out part 6. That is, the power leads 8 and the sensor leads 7 are retained separately, thereby attaching the respective leads to the lead wiring part 1 more firmly than when the respective leads are retained together. This enables an improvement in reliability and, accordingly, in quality. Furthermore, using the legs 41 of the power-lead retaining part 4 for retaining the sensor leads 7 as well facilitates the assemblage and reduces the cost. The facilitation of the assemblage improves the quality.

As illustrated in FIG. 3, a spacer 90 is inserted into each of the spaces between the adjacent winding sections 84. As illustrated in FIG. 2, the spacer 90 can be divided in the direction of the central axis. More specifically, the spacer 90 can be divided into a first spacer 90*a* on the counter-connection side and a second spacer 90*b* on the connection side.

A plurality of first spacers 90*a* are coupled to one another integrally through an annular first coupling portion 91 disposed on the counter-connection side of the stator core 82. A plurality of second spacers 90*b* are coupled to one another integrally by an annular second coupling portion 92 disposed on the connection side of the stator core 82. The spacer 90, the first coupling portion 91, and the second coupling portion 92 are formed by using a thermosetting resin or a thermoplastic resin.

The first spacer 90*a* and the second spacer 90*b* abut on each another at parts thereof, and such parts have their fitting portions 93 formed thereat. The fitting portions 93 fit together. In the present embodiment, as illustrated in FIG. 2, the fitting portions 93 are a recess 93a formed in the first spacer 90a and a protrusion 93b formed in the second spacer 90b, the protrusion 93b fitting in the recess 93a. The protrusion 93b may be formed in the first spacer 90a and the recess 93a may be formed in the second spacer 90b.

The first spacer 90a and the second spacer 90b have first spacer positioning portions 94 formed therein for positioning the spacer 90. More specifically, the first spacer positioning portion 94 abuts on the end surface of the stator core 82 on the counter-connection side or the connection side, such that the spacer 90 is positioned with respect to the axial direction. Also, the first spacer positioning portion 94 fits between the adjacent insulating outer walls 83a of the insulating portion 83, such that the spacer 90 is positioned with respect to the circumferential direction.

Formed in the first spacer 90a is a second spacer positioning portion 95 for positioning the stator core 82 in a mold when the molded portion 99 (see FIG. 11) is formed by molding. The second spacer positioning portion 95 is a projection that projects to the counter-connection side. When the molded portion 99 is molded, the second spacer positioning portions 95 abut on the mold, such that the stator core 82 is positioned in the mold and displacement of the core unit 20 during the molding is suppressed. This can improve the quality of the stator 10 that is to be manufactured.

A resin, which is filled into the space between the adjacent winding sections 84, to form a resin section 96. Since the spacer 90 is inserted into the space between the adjacent winding sections 84, the amount of resin used for forming the resin section 96 can be reduced. Accordingly, the manufacturing cost of the stator 10 can be reduced. The resin section 96 is formed as a part of the molded portion 99 when the molded portion 99 is formed. Thus, the resin section 96 is not formed in the core unit 20 in the state illustrated in FIG. 3 prior to the formation of the molded portion 99, but the resin section 96 is illustrated in hatching in FIG. 3 for the purpose of illustration. As far as the spacer 90 is inserted into at least one of the spaces between the adjacent winding sections 84, the effect of reducing the amount of resin used for forming the resin section 96 can be obtained. Furthermore, a plurality of the spacers 90 may be inserted into the single space.

Since the plurality of the spacers 90 is coupled by the first coupling portion 91 and the second coupling portion 92, the plurality of the spacers 90 can be inserted together into the spaces between the winding sections 84. Therefore, as compared to a case where the spacers 90 are separately inserted into the spaces, a work for assembling the stator is facilitated and the manufacturing cost can be reduced.

Since the spacer 90 is divided into the first spacer 90a and the second spacer 90b, a work for inserting the spacer 90 between the winding sections 84 can be facilitated and the manufacturing cost can be reduced.

Since the first spacer 90a and the second spacer 90b fit together by the fitting portions 93, the spacer 90 is unlikely to fall off during the manufacturing process.

Since the spacer 90, the first coupling portion 91, and the second coupling portion 92 are formed by using a thermosetting resin or a thermoplastic resin, these portions can be manufactured by using a crushed material such as runner, and the material cost can be reduced.

Figure 13:
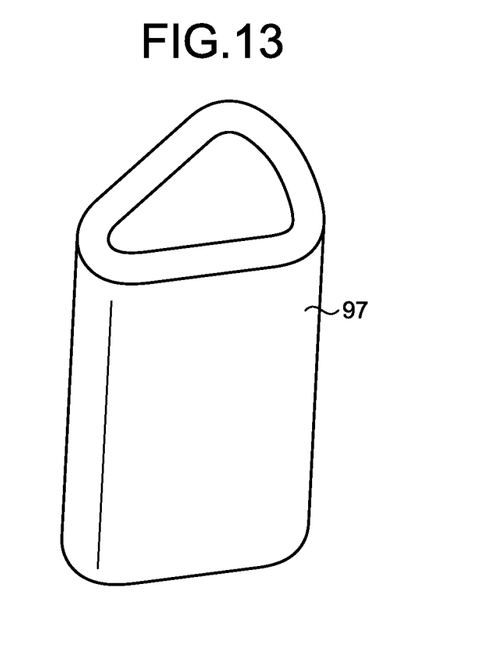
FIG. 13 is a view illustrating an example of an adjustment member in the first embodiment.

An adjustment member may be used in conformance to the size of the gap between the winding sections 84 and the length of the stator core 82 in the axial direction. FIG. 13 is a view illustrating an example of the adjustment member in the first embodiment. When the gap between the winding sections 84 is larger than the spacer 90, as illustrated in FIG. 13, a ring-shaped adjustment member 97 having an inner diameter larger than the outer diameter of the spacer 90 may be used. Inserting the spacer 90 between the winding sections 84 with the spacer 90 being inserted within the adjustment member 97, that is, with the outer circumference of the spacer 90 being surrounded by the adjustment member 97 can reduce the size of the space between the winding sections 84, which space is filled with a resin. Accordingly, the amount of resin used for forming the resin section 96 is reduced and the manufacturing cost can be reduced.

Figure 14:
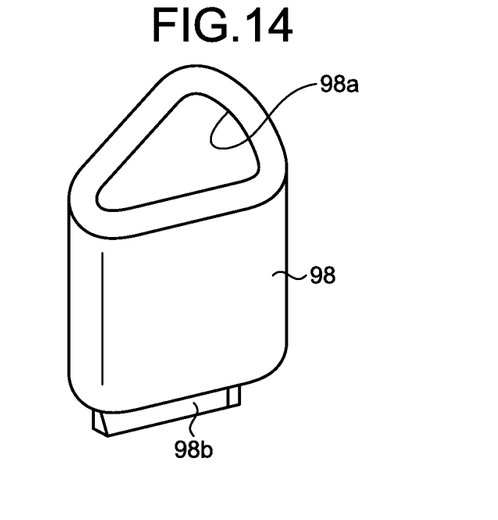
FIG. 14 is a view illustrating another example of the adjustment member in the first embodiment.

FIG. 14 is a view illustrating another example of the adjustment member in the first embodiment. When the length of the stator core 82 in the axial direction is longer than the length of the spacer 90, as illustrated in FIG. 14, an adjustment member 98 having a recess 98a formed on one end thereof and a protrusion 98b on the opposite end may be sandwiched between the first spacer 90a and the second spacer 90b. As the protrusion 98b of the adjustment member 98 fits in the recess 93a formed in the first spacer 90a and the protrusion 93b formed in the second spacer 90b fits in the recess 98a of the adjustment member 98, such that the first spacer 90a, the second spacer 90b, and the adjustment member 98 can be coupled to one another stably. A plurality of the adjustment members 98 may be sandwiched between the first spacer 90a and the second spacer 90b in conformance to the length of the stator core 82 in the axial direction.

As described above, using the adjustment members 97 and 98 in conformance to the size of the gap between the winding sections 84 and the length of the stator core 82 in the axial direction can achieve the reduction in the resin amount and the stable coupling among the first spacer 90a, the second spacer 90b, and the adjustment member 98. Accordingly, it is not necessary to provide a plurality of types of spacers 90 in conformance to the size of the gap between the winding sections 84 and the length of the stator core 82 in the axial direction. Therefore, the number of types and the size of equipment necessary for manufacturing the spacer 90 can be reduced, thereby enabling the reduction in the manufacturing cost.

Using the adjustment members 97 and 98 facilitates uniformity of the gap between the winding section 84 and the spacer 90 (the adjustment members 97 and 98). This can improve the product quality.

As illustrated in FIG. 11, the stator 10 can be obtained by molding a mold resin, for example, a thermoplastic resin such as a BMC (bulk molding compound) to form the molded portion 99 around the outer circumference of the core unit 20 having the leads illustrated in FIG. 4 connected thereto. When the molded portion 99 is formed, a resin is filled between the winding sections 84, thereby forming the resin section 96 as a part of the molded portion 99.

Figure 15:
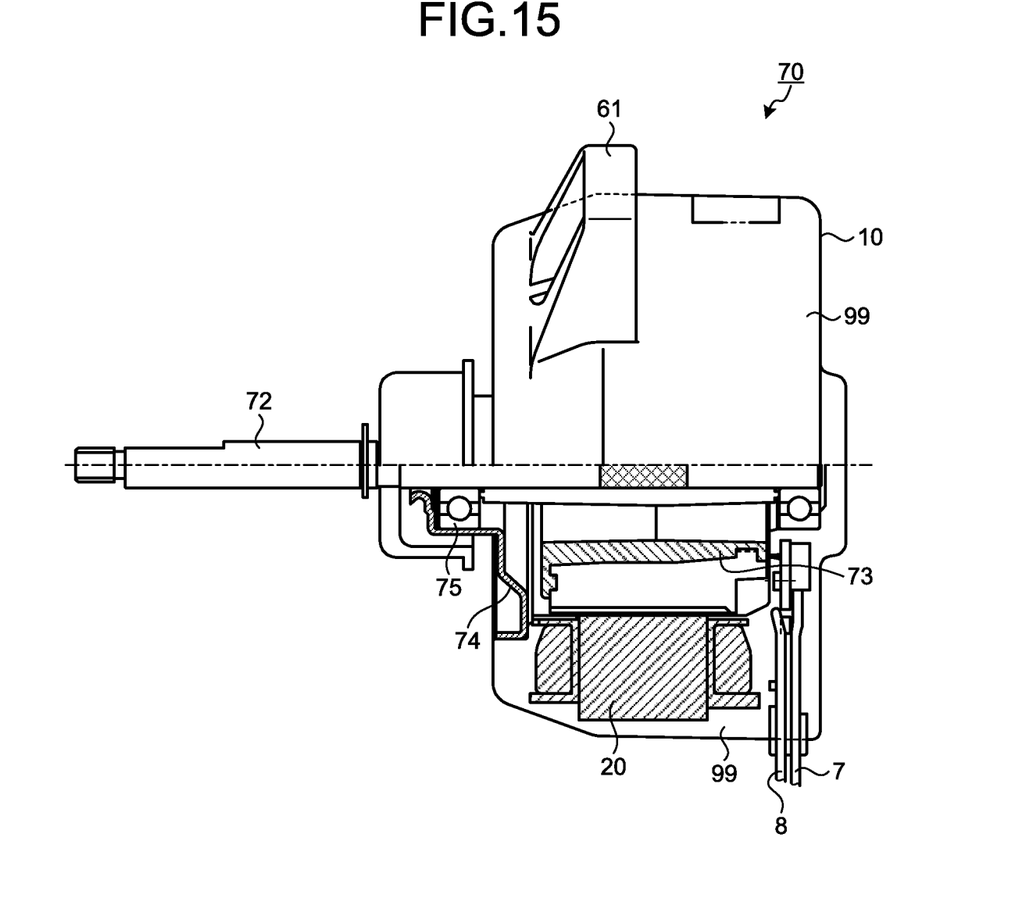
FIG. 15 is a side view of an electric motor according to the first embodiment.

FIG. 15 is a side view of an electric motor according to the first embodiment. A molded electric motor (electric motor) 70 illustrated in FIG. 15 is obtained by incorporating the rotor 73, a bracket 74, and a bearing 75 into an opening 62 of the stator 10.

Figure 16:
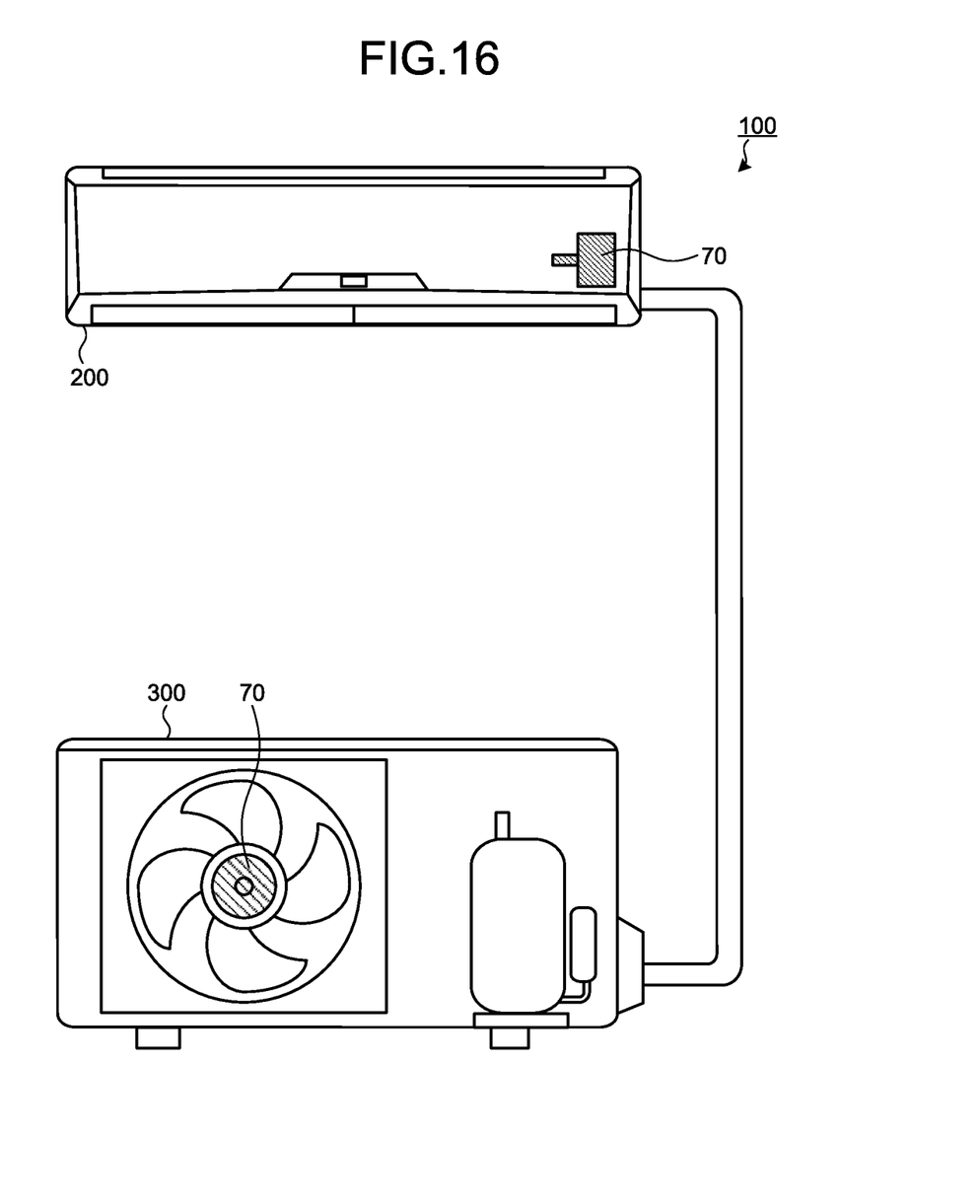
FIG. 16 is a view illustrating a schematic configuration of an air conditioner according to the first embodiment.

FIG. 16 is a view illustrating a schematic configuration of an air conditioner according to the first embodiment. An air conditioner 100 includes an indoor unit 200 and an outdoor unit 300 connected to the indoor unit 200. The molded electric motor 70, which is a driving source for a fan, is provided in each of the indoor unit 200 and the outdoor unit 300. When the molded electric motor 70 is installed in each of the indoor unit 200 and the outdoor unit 300, a plurality of attaching legs 61 extending radially outwardly from the outer circumferential side of the stator 10 are used. Using the molded electric motor 70 as an electric motor for a fan, which is a main part of the air conditioner 100, in such a manner, can provide the air conditioner 100 that is low in cost and is of good quality.

The configurations illustrated in the above embodiment are mere examples of the content of the present invention, and they may be combined with other known techniques. Further, the configurations may be partly omitted or changed without departing from the spirit of the present invention.

The invention claimed is:

1. A stator comprising:
   a stator core, including a core back having a cylindrical shape and a plurality of teeth projecting toward a central axis of the cylindrical shape, the stator core having one end surface and an opposite end surface;
   a plurality of winding sections circumferentially disposed at an equal interval;
   an insulating portion covering an outer circumference of the plurality of teeth, the insulating portion including insulating outer walls provided outside the plurality of winding sections for preventing the plurality of winding sections from falling toward an outer circumferential side of the stator core;
   a plurality of spacers each inserted into a space between adjacent ones of the winding sections;
   a resin section surrounding the spacer and filling the space into which the spacer is inserted;
   an annular coupling portion coupling the spacers to one another; and
   a first spacer positioning portion extending from an outer circumferential edge of the annular coupling portion along a corresponding one of the spacers for positioning the corresponding spacer, the first spacer positioning portion abutting on the one end surface of the stator core and fitting between adjacent ones of the insulating outer walls.

2. The stator according to claim 1, wherein
the spacer has a second spacer positioning portion formed therein, the second spacer positioning portion positioning the stator when the space is filled with the resin section.

3. The stator according to claim 1, wherein
the spacer is dividable into pieces in a direction perpendicular to a direction of arrangement of the winding sections.

4. The stator according to claim 3, wherein
the pieces of the divided spacer abut on one another at parts thereof, the parts having fitting portions formed thereat, the fitting portions fitting together.

5. The stator according to claim 3, further comprising
an adjustment member sandwiched between the pieces of the divided spacer.

6. The stator according to claim 1, further comprising
a triangular-cross-sectional adjustment member into which the spacer is inserted.

7. The stator according to claim 1, wherein
the spacer is formed by using a thermosetting resin or a thermoplastic resin.

8. An electric motor comprising:
the stator according to claim 1; and
a rotor that is rotatably disposed inside the winding sections.

9. An air conditioner using the electric motor according to claim 8 as an electric motor for a fan.

* * * * *